US008029342B2

(12) United States Patent
Anderson et al.

(10) Patent No.: US 8,029,342 B2
(45) Date of Patent: Oct. 4, 2011

(54) METHOD AND APPARATUS FOR EUTHANIZING ANIMALS

(75) Inventors: David S. Anderson, Easton, PA (US); Leslie B. Anderson, Easton, PA (US); Cullen L. Speakman, Reading, PA (US)

(73) Assignee: Euthanex Corporation, Palmer, PA (US)

( * ) Notice: Subject to any disclaimer, the term of this patent is extended or adjusted under 35 U.S.C. 154(b) by 430 days.

(21) Appl. No.: 12/251,458

(22) Filed: Oct. 14, 2008

(65) Prior Publication Data

US 2009/0126647 A1 May 21, 2009

Related U.S. Application Data

(60) Provisional application No. 60/979,514, filed on Oct. 12, 2007, provisional application No. 61/097,861, filed on Sep. 17, 2008.

(51) Int. Cl.
*A22B 3/00* (2006.01)

(52) U.S. Cl. .......... 452/66

(58) Field of Classification Search .......... 452/52, 452/57–61, 66
See application file for complete search history.

(56) References Cited

U.S. PATENT DOCUMENTS

| | | | | |
|---|---|---|---|---|
| 1,849,194 | A | 3/1932 | McCurrie | |
| 2,064,822 | A | 12/1936 | Cramer et al. | |
| 2,172,768 | A | 9/1939 | Liston | |
| 3,356,087 | A | 12/1967 | Guttman | |
| 4,107,818 | A * | 8/1978 | Scott et al. | 606/1 |
| 4,807,615 | A | 2/1989 | Nakagawa et al. | |
| 4,941,431 | A | 7/1990 | Anderson et al. | |
| 5,112,270 | A * | 5/1992 | Howard et al. | 452/66 |
| 5,584,139 | A | 12/1996 | Wentworth | |
| 5,643,072 | A * | 7/1997 | Lankhaar et al. | 452/66 |
| 5,752,506 | A | 5/1998 | Richardson | |
| 6,352,076 | B1 | 3/2002 | French | |
| 6,681,607 | B2 | 1/2004 | Geringer | |
| 6,776,158 | B1 | 8/2004 | Anderson et al. | |
| 6,881,607 | B2 | 4/2005 | Farnworth | |
| 7,341,023 | B2 | 3/2008 | Caplette | |
| 7,377,276 | B2 | 5/2008 | Roy et al. | |
| 7,448,943 | B1 * | 11/2008 | Woodford et al. | 452/66 |
| 7,503,323 | B2 | 3/2009 | Dalgetty et al. | |

(Continued)

FOREIGN PATENT DOCUMENTS

JP 2005-143389 6/2005

(Continued)

OTHER PUBLICATIONS

Third Party Observation submitted to the European Patent Office on Sep. 29, 2010, 7 pages.

(Continued)

*Primary Examiner* — Richard Price, Jr.

(74) *Attorney, Agent, or Firm* — Stephen H. Eland; Dann, Dorfman, Herrell & Skillman

(57) ABSTRACT

A system for safely and humanely anesthetizing and/or euthanizing animals is provided. The system provides both manual and automated operation and may be scaled up to accommodate a large number of animals during a single procedure. The system includes a chamber 20 for receiving an animal to be anesthetized or euthanized and a supply of gas is provided for the chamber, and a fluid controller (65, 165, 265, 365) controls the flow of gas to the chamber. In one embodiment, a valve (75) controls the flow of exhaust air to the chamber.

21 Claims, 10 Drawing Sheets

U.S. PATENT DOCUMENTS

| | | | |
|---|---|---|---|
| 7,549,397 | B2 | 6/2009 | Caplette |
| 7,717,773 | B2 * | 5/2010 | Woodford et al. .............. 452/66 |
| 7,794,310 | B2 * | 9/2010 | Lang ............................... 452/66 |
| 2002/0017301 | A1 | 2/2002 | Lundin |
| 2002/0103443 | A1 | 8/2002 | Roy et al. |
| 2005/0022808 | A1 | 2/2005 | Caplette |
| 2005/0095969 | A1 | 5/2005 | Mosher et al. |
| 2006/0011143 | A1 | 1/2006 | Drummond et al. |
| 2006/0086038 | A1 | 4/2006 | Mosher |

FOREIGN PATENT DOCUMENTS

| | | |
|---|---|---|
| JP | 2005-247876 | 3/2007 |

OTHER PUBLICATIONS

Lambooy et al, Euthanasia of Mink With Carbon Monoxide, The Veternary Record, Apr. 13, 1985, V. 116, p. 416.

Leach et al, Aversion to Gaseous Euthanasia Agents in Rats and Mice, Comparative Medicine, Jun. 2002, vol. 52, No. 3, p. 249-257.

Journal of American Veternary Medicine, vol. 202, No. 2, 1993, p. 229-249.

D.C. Fenwick, Carbon Dioxide As a Short-Term Restraint Anaesthetic in Rats With Subclinical Respiratory Disease, Laboratory Animals, 1989, 23, p. 220-228.

Automatic Timing Controls Inc. Model 765 website information.

* cited by examiner

METHOD AND APPARATUS FOR EUTHANIZING ANIMALS

PRIORITY CLAIM

This application claims priority to U.S. Provisional Patent Application No. 60/979,514, filed Oct. 12, 2007, and U.S. Provisional Patent Application No. 61/097,861 filed Sep.17, 2008. The entire disclosure of each of the foregoing provisional patent application is hereby incorporated by reference.

FIELD OF THE INVENTION

The present invention relates to the field of anesthetizing and euthanizing animals, such as small mammals. In particular, the present invention provides a system for use in research and testing laboratories for safely and humanely anesthetizing and/or euthanizing animals. The system provides both manual and automated operation and may be scaled up to accommodate a large number of animals during a single procedure.

BACKGROUND

Frequently, many organizations, such as research organizations need to anesthetize or euthanize animals, such as mice or rats that were used during research. One common way of euthanizing small mammals is to expose the animals to CO2 in an enclosure. However, frequently, the procedure is done by untrained individuals so that the animal unnecessarily suffers during the procedure. Additionally, frequently, untrained individuals may not understand the quantity of CO2 that can leak into the room if the procedure is performed incorrectly. At best such leakage leads to a waste of compressed CO2, at worst, it can create a health problem for those in the vicinity.

SUMMARY OF THE INVENTION

In light of the foregoing, it is desirable to provide a system that allows the safe and humane anesthetization and/or euthanization of animals. It is also desirable to provide a system that can be automated so that the system does not rely on the training of the individual operating the system. Further, it is desirable to provide an automated system that can be implemented in a cost-effective manner. The system enables the supply of a sedative gas which has both anesthetizing and euthanizing properties, depending on the concentration of the gas within the chamber. The system uses a sedative gas which, when used in high concentration, induces cessation of metabolic functions, i.e., euthanasia.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
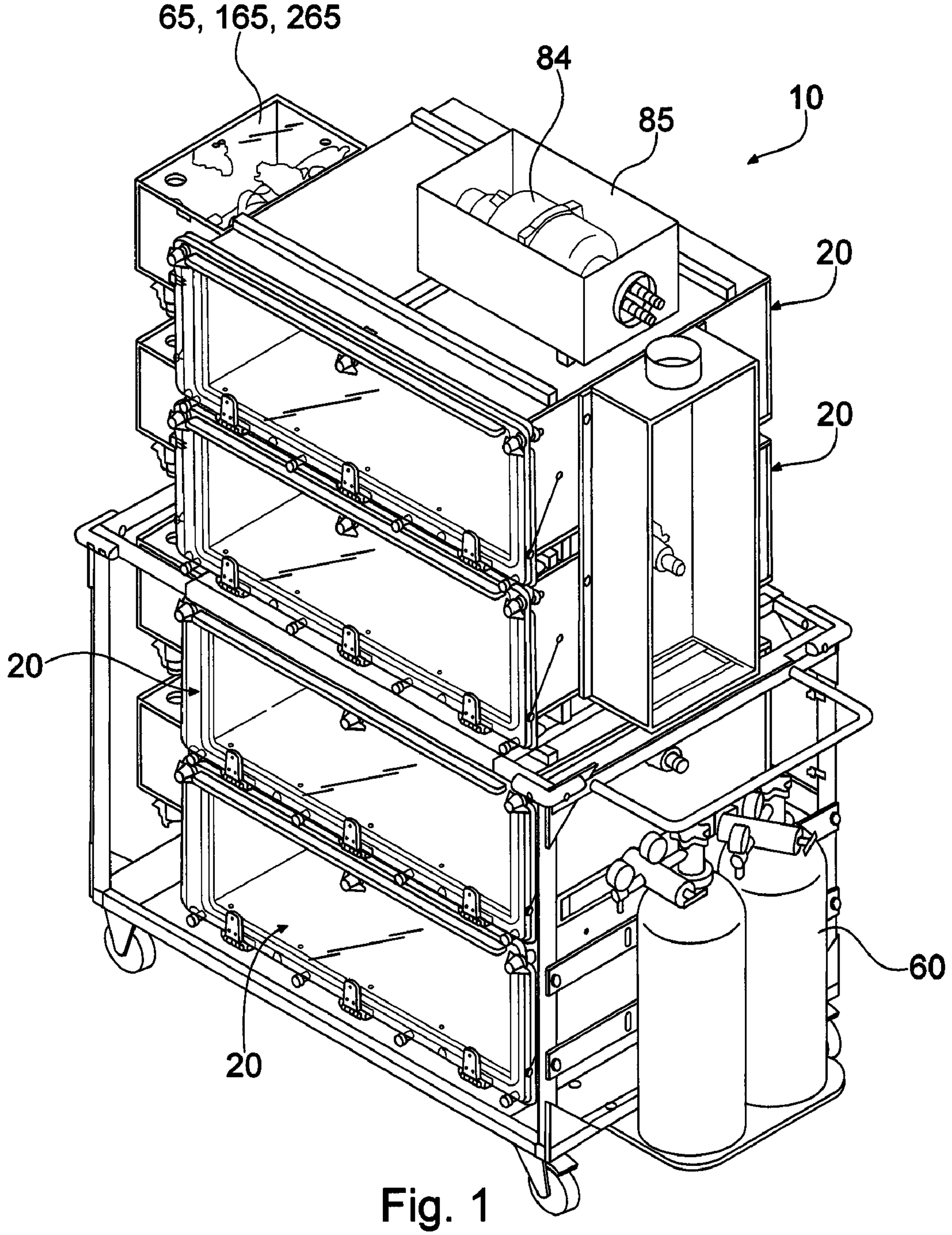
FIG. 1 is a perspective view of a system for euthanizing animals.

Referring now to the drawings in general, a system for anesthetizing and/or euthanizing animals is referred to generally as 10. The system provides for either a manually controlled or automatically controlled system for anesthetizing and/or euthanizing animals. The system includes one or more chambers 20 for receiving the animal(s) and a supply of sedative gas 60 for anesthetizing and/or euthanizing the animals. Additionally, the system may include a controller for automatically controlling the flow of gas to the chamber 20.

The chamber 20 is configured to receive a plurality of small mammals. The chamber is particularly suited for receiving a plurality of cages containing small mammals, such as mice, rats or rabbits. In the present instance, the chamber is configured to receive up to sixteen mouse cages by lining up a row of eight cages on the bottom of the chamber and then stacking a second row of eight cages on top of the first row of cages. Alternatively, the chamber may receive a row of three rat cages. Similarly, the chamber may receive cages of other animals depending on the size of the cage.

Figure 4:
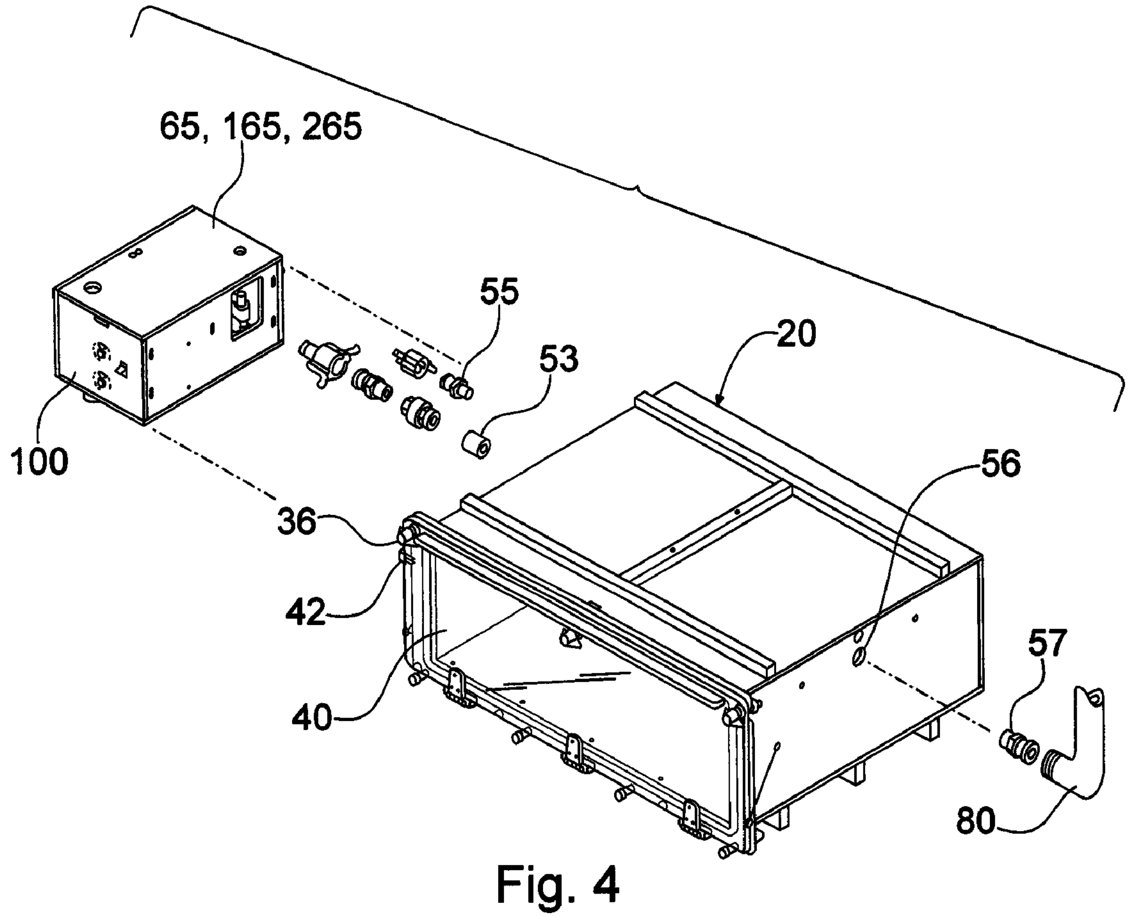
FIG. 4 is a perspective view of a chamber and fluid controller of the system for euthanizing animals illustrated in FIG. 1.
Figure 5:
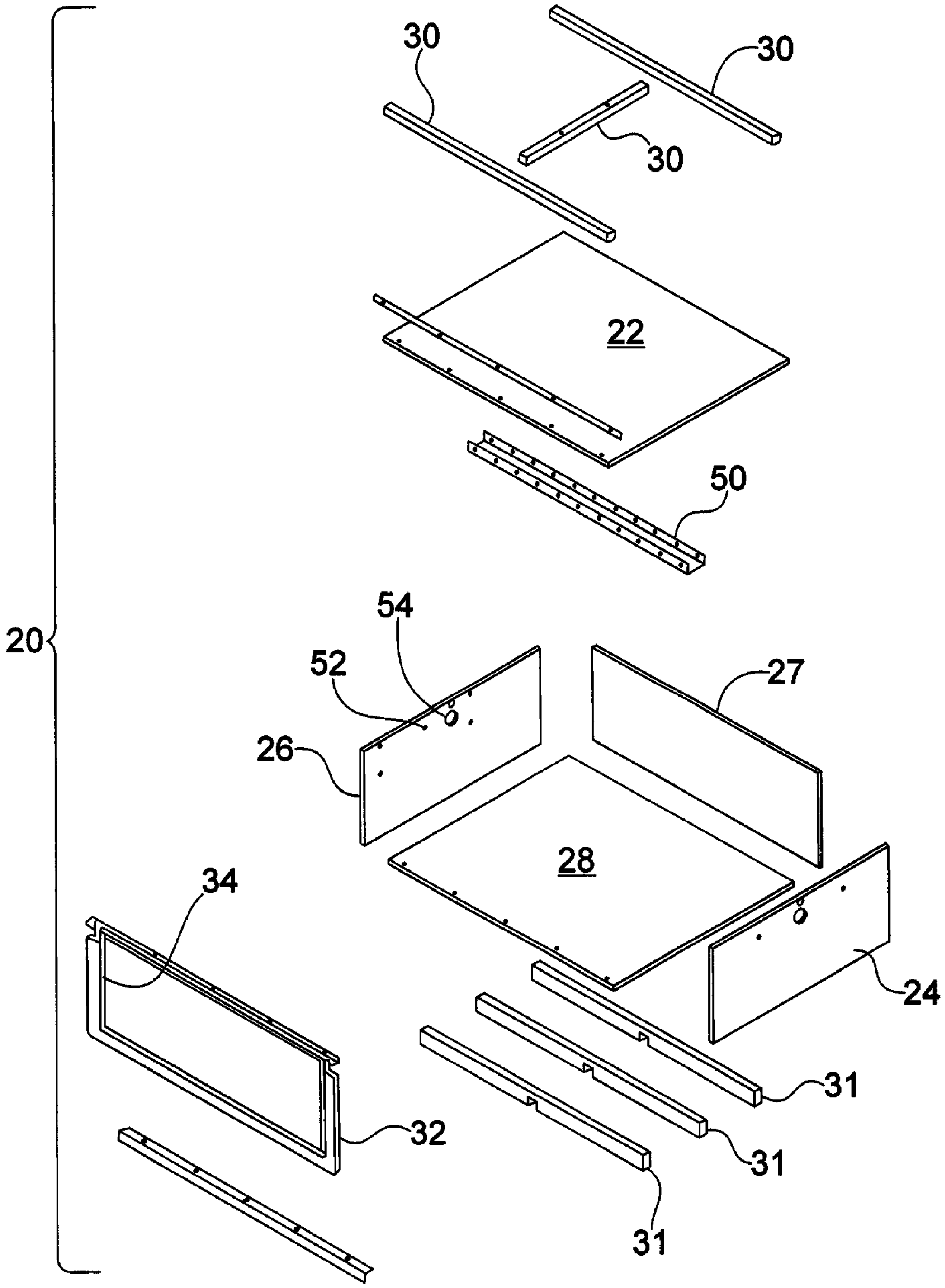
FIG. 5 is an exploded perspective view of the chamber illustrated in FIG. 4.
Figure 6:
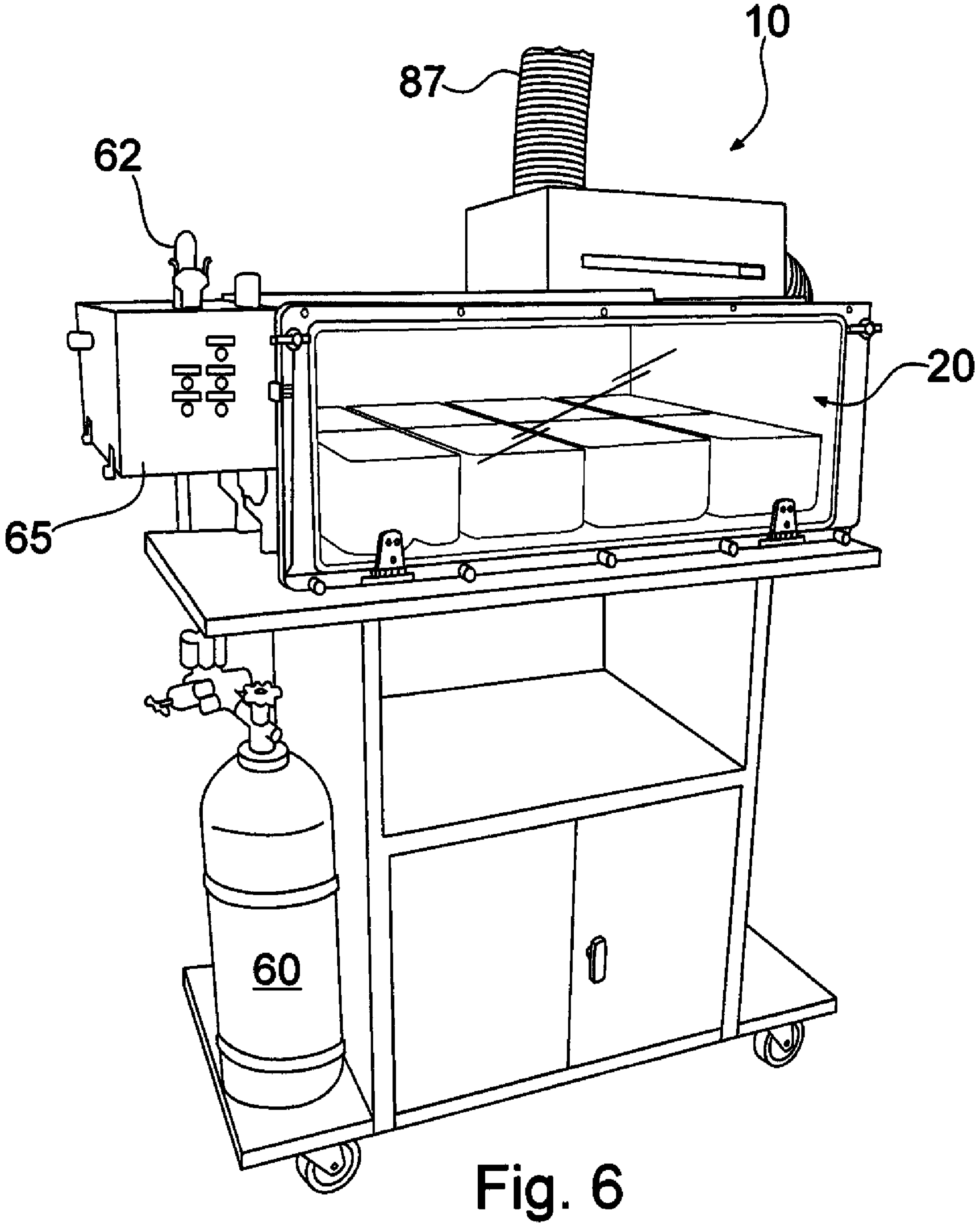
FIG. 6 is a perspective view of the system for euthanizing animals illustrated in FIG. 1, shown with a single chamber.

Referring to FIGS. 4-5, the details of the chamber 20 will be described. The chamber 20 is a generally rectangular box having a generally closed top 22, a bottom 28, a back 27, a right side 24 and a left side 26. The front side of the chamber however, is generally opened. A front flange 32 extends around substantially the entire front side of the chamber 20. The flange projects upwardly from the front face along the top side and the flange projects downwardly from the front face along the bottom side of the chamber. Similarly, the flange projects outwardly to the right along the right side and outwardly to the left along the left side. In the present instance, a groove is formed in the flange for receiving a seal 34. For instance, the seal 34 may be an elastomeric material, such as rubber, that seats in the groove in the flange. Alternatively, the seal 34 may be fixed to the flange without a groove. In either instance, the seal may be fixed to the flange 32 such as by an adhesive.

The seal 34 extends around substantially the entire periphery of the front face of the chamber to provide a substantially continuous seal around the front of the chamber. Additionally, although the seal is described as being formed in and/or connected with the flange 32 of the chamber, the chamber does not need to include the flange. Instead the seal 34 may be formed in, or attached to, the front face of the chamber along the thickness of the top 22, bottom 28, right side 24 and left side 26 of the chamber.

A pivotable door 40 is provided to close the generally opened front side of the chamber 20. In the present instance, the door 40 is connected to the chamber via one or more hinges along the bottom edge of the chamber. Alternatively, the door may be connected to the chamber by one or more hinges along a different edge, or the door may be separable from the chamber and connectable by one or more latches. Additionally, in the present instance, one or more latches 36 are provided to latch and/or against the front face of the chamber after the door is pivoting upwardly. The latches 36 lock the door in the closed position. Further, a sensor may be provided on the door to sense whether the door is opened. As discussed further below, if the sensor sends a signal indicating that the door is open, the system may discontinue the flow of anesthetizing/euthanizing gas to the chamber. Alternatively, the system may include an automated lock or latch that automatically latches the door in a locked position once the cycle for sedating an animal begins. Specifically, upon actuating a cycle to sedate one or more animals, the system may send a signal to an actuator, such as a solenoid, that displaces a latch to lock the door. The actuator will remain in an actuated position so that the door remains locked until the sedation cycle is completed. Upon completion of the sedation cycle, the controller for the system may send a signal to the actuator to de-actuate the actuator thereby unlocking the door so that the operator can open the door.

The door 40 cooperates with the seal 34 to provide a fluid-tight seal. Specifically, in the present instance, when the door 40 is pivoted upwardly into the closed position against the seal, the door engages the seal along at least substantially the entire length of the seal. In this way, the cooperation of the door and the seal provides a fluid-tight seal to substantially impede the leakage of gas from the chamber door in use.

The walls of the chamber 20 may be formed of any of a plurality of materials, including but not limited to, plastic, metal or wood. In the present instance, the walls are formed of plastic, such as polypropylene. Additionally, in the present instance the walls are approximately ⅜-½ inch thick.

The chamber may also include one or more ribs or stiffeners 30 attached to the top of the chamber. In the present instance, the stiffeners 30 are generally elongated beams that extend along the width of the chamber. Furthermore, a stiffener 30 may also extend along the top side between the stiffeners that extend across the width of the chamber. In the present instance, the stiffeners are approximately the same thickness as the height of the flange 32 so that the top of the flange is approximately the same height as the top edge of the stiffeners.

In addition, the chamber may also include a plurality of stiffening elements, 31 attached to the bottom wall of the chamber 20. As with the upper stiffening elements, the lower stiffening elements extend across the width of the chamber and may also extend from the front of the chamber to the rear. Additionally, the lower stiffening elements may be solid or hollow elongated bars that have a thickness so that the lower edge of the stiffening elements 31 are approximately the same height as the lower edge of the flange 32 along the bottom wall of the chamber.

The upper and lower stiffening elements 30, 31 may be connected to the upper and lower walls 22, 28 in any of a variety of ways, including adhesives or fasteners, such as screws. However, in the present instance, the stiffening elements are plastic elements that are fixedly connected to the upper and lower walls by welding.

Although the walls of the chamber and the door provide a generally sealed enclosure, the chamber includes a plurality of ports for supplying and exhausting anesthetizing and/or euthanizing gas, and for providing oxygenated or other gas to re-fill the chamber after use. Specifically, an exhaust port 56 is formed in the right side 24 of the chamber. The exhaust port 56 may include a connector 57 for interconnecting the exhaust port with an exhaust line 80. For instance, in the present instance, a connector such as a 1 inch NPT quick-connect fitting 57 is connected to the exhaust port 56 for providing a fluid-tight releasable connection between the exhaust port and the exhaust line 80. Alternatively, the exhaust port 56 may be connected with a fitting that provides a fluid-tight fitting for fixedly connecting the exhaust port with the exhaust line. Further still, the chamber may be configured so that the exhaust port 56 does not include a separate fitting. Instead, the exhaust line 80 may include the structure for providing a generally fluid-tight connection between the exhaust line 80 and the chamber 20 through the exhaust port 56.

In addition to the exhaust port 56, the chamber includes a supply port 52. In the present instance, a supply port 52 is located in the left wall 26 of the chamber. Similar to the exhaust port 56, the supply port 52 may include a connector for providing a fluid tight connection between the chamber 20 and a gas supply line 62.

The chamber 20 may also include a refresh port 54 for providing a supply of gas to refresh the atmosphere within the chamber after the anesthetizing/euthanizing gas is exhausted from the chamber. In the present instance, the refresh port 54 is located in the left wall 26 of the chamber. Additionally, in the present instance, a fluid controller or valve 75 is connected with the refresh port 54. Specifically, the fluid controller is connected to the port 54 via a fitting connected with the port. The fitting provides a fluid-tight seal, such as an NPT pipe fitting. The valve 75 may be any of a variety of valves for opening and closing the flow of gas to the refresh port. For instance, the refresh port valve 75 may be a ball valve or gate valve that is automatically or manually controlled. However, in the present embodiment, the control valve 75 for the refresh port 54 is a check valve. The check valve is oriented to impede the flow of air out of the chamber. In this way, if the gas pressure within the valve elevates, the check valve impedes the flow of gas out of the chamber through the refresh port 54.

As described above, the chamber includes a supply port for supplying a flow of anesthetizing/euthanizing gas to the chamber. Additionally, the chamber may include a gas dispersion system for facilitating the even distribution of anesthetizing/euthanizing gas. For instance, the chamber may include a gas rail 50 with a plurality of spaced apart discharge ports. The rail 50 extends along a substantial amount of the width of the chamber. In the present embodiment, the rail is a hollow tubular element in fluid communication with the supply port 52. The end of the rail remote from the supply port 52 abuts the right wall 24 of the chamber to seal the end of the rail. In this way, the flow of anesthetizing/euthanizing gas flows through the rail and is discharged through the discharge ports that are along the rail.

The dispersion rail 50 may be positioned at a variety of locations within the chamber. However, in the present instance, the rail is fixedly connected to the top wall or adjacent the top wall, and the rail extends substantially the entire width from the right wall to the left wall. Alternatively, the rail 50 may extend from the front to the rear, or the rail may be a configuration of one or more interconnected elements extending between the right and left walls 24, 26 and the front of the chamber and the rear of the chamber.

As discussed above, the system 10 includes a supply 60 of anesthetizing/euthanizing gas. A variety of gases can be used as an anesthetizing unit or euthanizing gas. For instance, at certain levels, CO2 anesthetizes animals. At a concentration is higher than the anesthetizing level, CO2 becomes a euthanizing gas. For this reason, the present system is particularly well-suited to operate in connection with CO2 gas. Accordingly, in the following discussion, the use of the term CO2 gas is used as an exemplary gas they can be used to anesthetize and/or euthanize an animal. However the use of the term CO2 is not intended to preclude the use of other gases used to anesthetize or euthanize an animal.

The chamber 20 includes a system for supplying and controlling the flow of anesthetizing/euthanizing gas to the chamber. In one embodiment, the system is a manual control system. In a second embodiment, the system is an automated control system that provides a fixed flow rate of gas. In yet another embodiment, the system is an automated control system that provides a variable flow of gas.

In a manual control system, the manually controllable valve is provided. The valve may be the regulator on the supply of gas, or it may be a gate valve, a ball valve or other type of valve. The valve is positioned between the gas supply 60 and the supply port 52. To provide a flow of gas, the valve is manually opened to allow gas to flow from the supply tank 60, through the supply line 62, and to the supply port 52 in the chamber.

In addition to the manual control embodiment, the system may use an automated control to control the flow of CO2 to the chamber 20. As discussed further below, the automated control may provide a fixed flow rate of CO2 or a variable flow rate of CO2.

Fixed Flow Control

Figure 8:
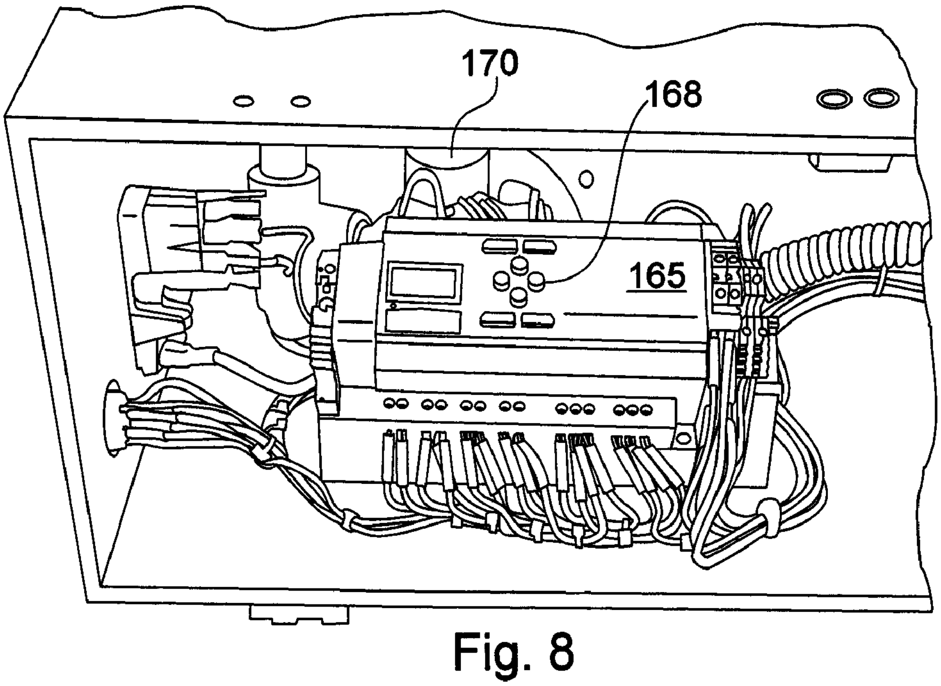
FIG. 8 is an enlarged view of a flow controller of a fixed flow embodiment of the system.

Referring to FIG. 8, a fixed flow control system uses a central controller 165 that controls operation of a valve 170 that opens and closes the flow of carbon dioxide to the chamber. Additionally, the system may include a regulator that limits the flow rate of the CO2 from the supply tank 60. Such a regulator may be manually operated to vary the flow rate, and after the regulator is manually adjusted, the system operates at the set flow rate until the regulator is manually adjusted to re-set the flow rate.

The controller 165 may be a variety of mechanical and or electronic controlled elements. In present instance, the fixed flow control is regulated based on time. When the system is actuated, the controller 165 controls the valve 170 to open the flow of carbon dioxide for a fixed period of time. After the fixed period, the controller 165 controls the valve to close the flow of CO2.

In one exemplary embodiment, the controller 165 is an electronic controller that includes a timer. Upon actuation of the system, the system controller controls a solenoid actuable valve 170 to open the valve in the supply line to open the flow of CO2. After a pre-set supply time, the controller controls the solenoid to close the valve in the supply, thereby shutting off the flow of CO2.

In addition to being connected with the valve 170 to control operation of the valve, the controller 165 is also connected with the exhaust fan 84. After completion of the introduction of the CO2, the controller 165 sends a signal to the exhaust fan at the appropriate time to start the exhaust fan, thereby commencing the exhaust cycle. As discussed further below, the controller may delay the start of the exhaust fan to allow for a dwell period in which the chamber is maintained in a generally sealed condition without the introduction of further sedating gas.

Figure 9:
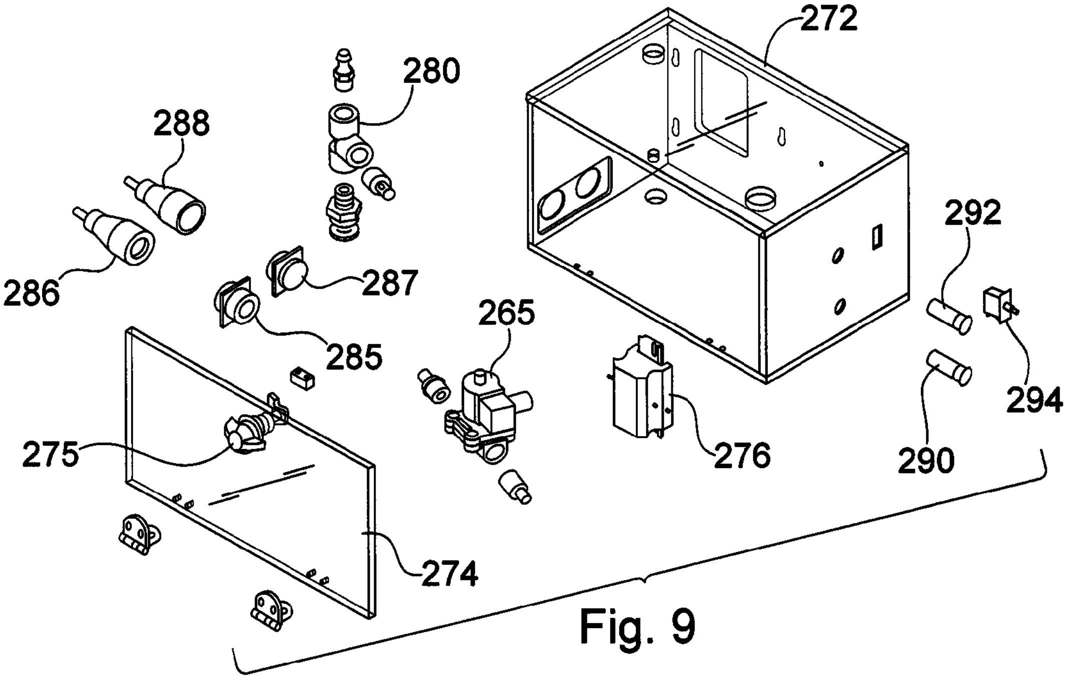
FIG. 9 is an exploded view of a control box of a variable flow embodiment of the system.

In the present instance, the controller is disposed within a control box 180 similar to the enclosure illustrated in FIG. 9 for the variably flow embodiment. The central further includes a plurality of control buttons 168 so that the operator may set various parameters for an operational cycle, such as the length of time that gas is introduced to the chamber to the gas supply stage, or the amount of time of the dwell period (i.e. the delay between the time that the controller ceases the flow of sedating gas and the start of the exhaust cycle), or the amount of time for the exhaust cycle (i.e. the length of time that the exhaust fan runs until the exhaust cycle and hence the operation cycle, is compete). Although the buttons for adjusting the parameters are disposed on the controller, preferably, the controller is locked within an enclosure, similar to the enclosure 270 illustrated in FIG. 9. Therefore, in the present instance, the enclosure/control box also includes a start button on the outside. In this way, a managing controller of a facility can access the controller by key to vary the operational parameters as desired. However, once the parameters are set, the system is fixed so that all the operator needs to do is load the animals into the chamber, lock the chamber door, and then press the start button on the control panel. The system then automatically controls the flow and the exhaust fan until the cycle is complete.

Variable Flow Control

A variable flow control system uses a central controller 300 that cooperates with the flow controller 265 to provide a variable flow of CO2. For instance, in an exemplary embodiment, the central controller 300 is a microprocessor that is interconnected with a mass flow control 305. The mass flow 305 controller is electronically connected with the central controller.

Figure 12:
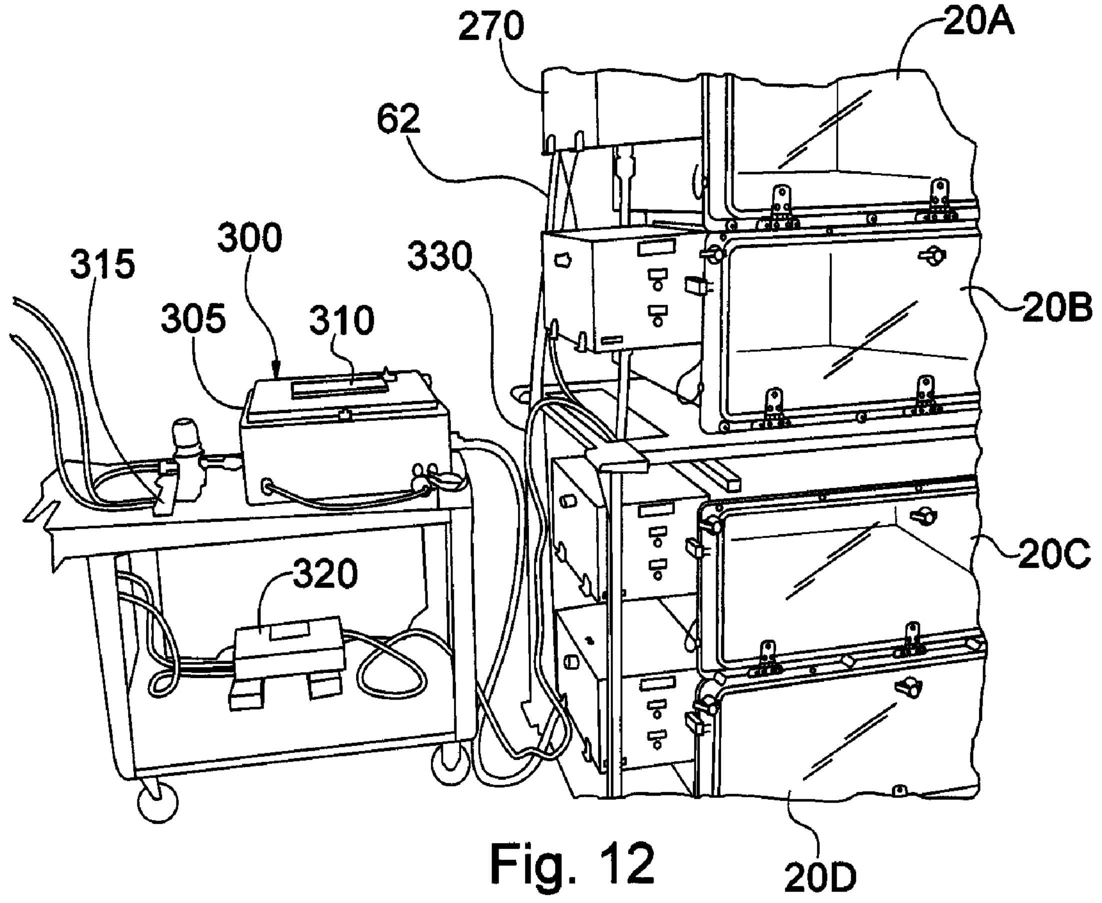
FIG. 12 is a perspective view of a variable flow embodiment of the system.

Referring to FIG. 12, the details of an exemplary variable flow system is illustrated. In the exemplary system, a plurality of tanks of CO2 are connected to a manifold 315. The manifold is connected with a heater 320 that is operable to heat the gas to reduce the possibility of the gas freezing components of the system and to warm the gas to improve the comfort to the animals. From the heater, the gas supply is connected to a regulator 325 that can adjust the flow of gas to the central controller 300. It should be noted that the heater may be incorporated with any of the configurations, including the manual system, automated fixed flow system, and the automated variable flow system.

The central controller 300 includes an operator input device, such as a touch screen 310, so that the operator can input various data that is used to control the operational cycle, such as inputting which chambers are to be processed, what type of animals are being processed etc. Based on the data input from the operator, the system controls the operation of the gas flow during the process.

The gas supply line exits the mass flow controller 305 and connects with one of the chambers 20. Additionally, a data line 330 connects the central controller with the chambers 20. For instance, the system may be configured to include a plurality of chambers, such as four, identified as 20A, 20B, 20C and 20D in FIG. 12. In such an instance, the data line connects the central controller 300 with the flow controller 265 of the first chamber 20A. The first chamber includes an output line 288 that interconnects with the flow controller 265 of the second chamber, thereby interconnecting the second chamber with the central controller. Similarly, the second chamber 20B is connected with the third chamber 20C and the third chamber is connected with the fourth chamber 20D.

In addition to having a data line connecting the central processor with the flow controllers of the chamber to control the flow of CO2 to the chambers 20A, 20B, 20C and 20D, a separate data line interconnects the central processor with the exhaust fan 84 to control operation of the control fan.

Based on system configurations, the central controller 300 sends signals to the mass flow controller indicative of the flow rate to be provided. The flow controller receives signals for the central controller and controls the flow rate of the CO2 to the chamber accordingly. The central controller may be programmed to vary the timing and flow rate of CO2 provided through the mass flow controller. The details of an exemplary structure of a variable flow automated control system are provided in co-pending U.S. application Ser. No. 11/301,146 filed on Dec. 12, 2005. The entire disclosure of U.S. application Ser. No. 11/301,146 is incorporated herein by reference. The central controller may set the programming of the programmable controls and delay means, and preferably has a recorder to create a record of the settings, the time of the settings and the operator responsible for the settings.

As discussed above, the central controller 300 controls a mass flow controller that controls the flow rate of the gas to the chambers. Additionally, each chamber includes a controller 265 for controlling the flow of CO2 to the chamber. In the present instance, the controller 265 is a solenoid actuated valve that is operable to open and close the supply line for supplying CO2 to the chamber 20.

Figure 10:
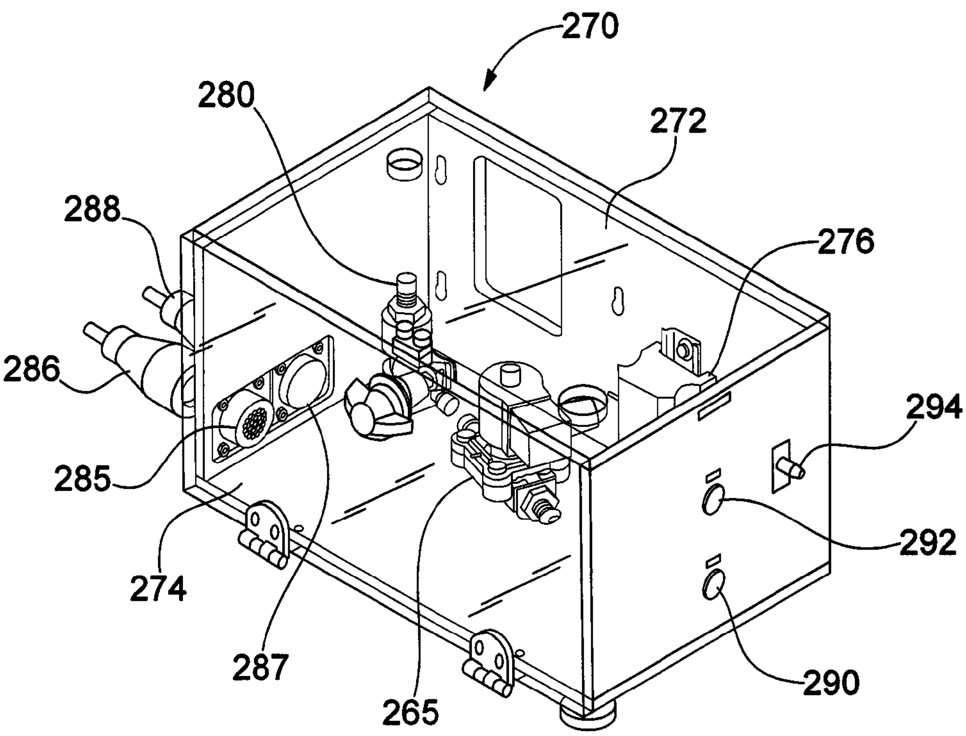
FIG. 10 is a perspective view of the control box of FIG. 9.
Figure 11:
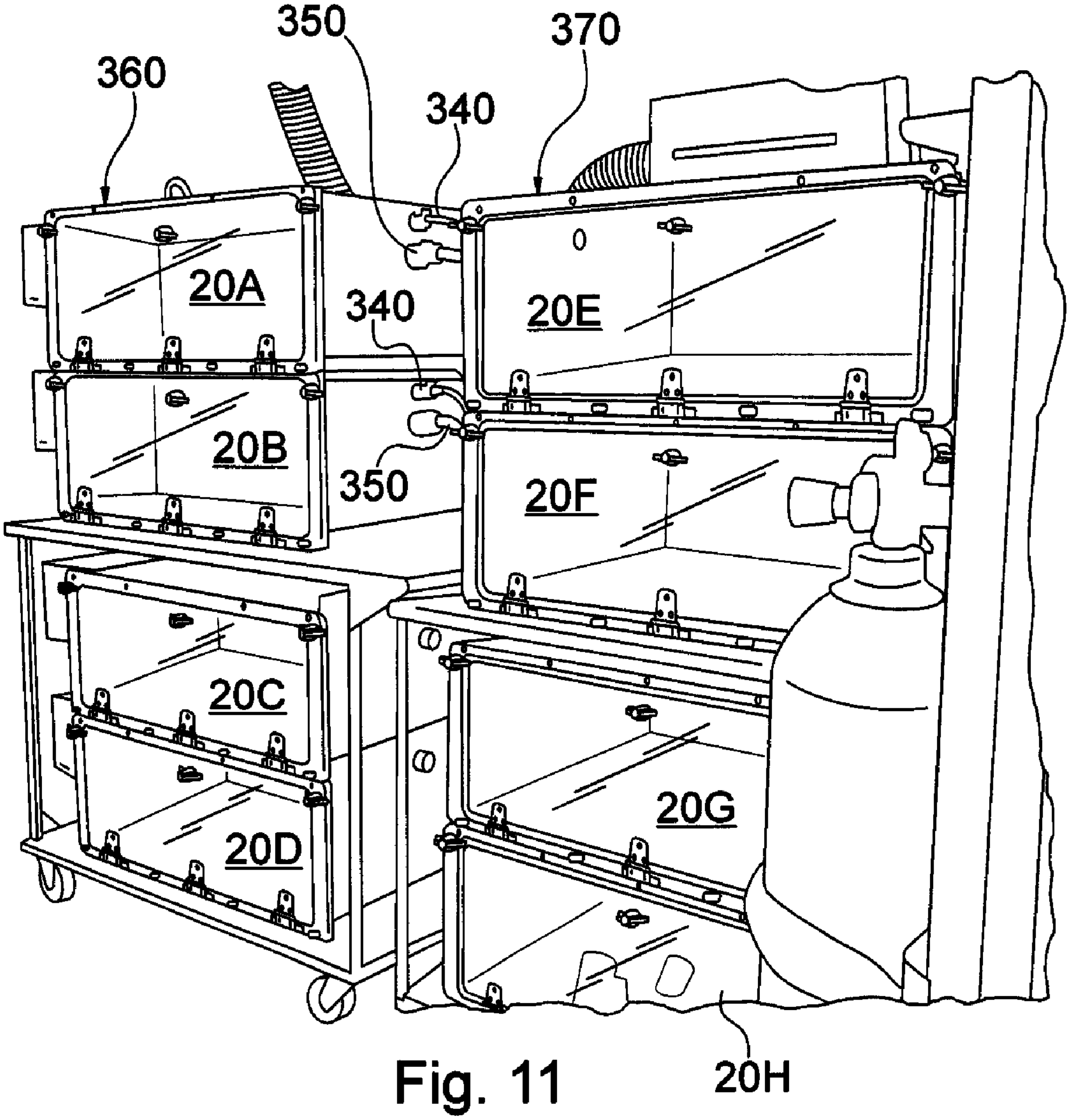
FIG. 11 is a perspective view of an embodiment of the system incorporating a second column of chambers.

The flow controller 265 is housed within an control box 270. An exemplary control box 270 is illustrated in FIGS. 9 and 10. The control box 270 comprises an enclosure 272 that is generally closed on all sides except the front. A door 274 is pivotably connected to the enclosure to close the front of the enclosure. Additionally, a lock 275, such as a keyed lock, is provided to prevent unauthorized access to the enclosure.

An electrical input connector 285 is connected to the rearward end of the enclosure 272. The input connector 285 is configured to cooperate with a electrical input plug 286 on the end of the data line 330 from the central controller or a data line from an adjacent chamber as described above. Additionally, the control box 270 includes an output connector 287 for connecting the chamber, as needed, with an output line having an output plug 288 so that the chamber may be electrically connected with another chamber to provide control signals from the central controller 300.

The control valve 265 has an input end connected with the CO2 supply line from the mass flow controller 305. The control valve has an output end that is connected with a T-connector 280 that is mounted in the enclosure. Specifically, the T-connector has an input from the control valve, and a first discharge attached to a gas line that is connected with the manifold in the chamber to supply CO2 to the chamber. The second end of the T-connector connects the chamber with the input end of the control valve 265 in an adjacent control box. In this way, the gas line from the mass flow controller is connected with the control box for the first chamber 20A, which in turn has a gas line connected with the control box of chamber 20B, which has a gas line connected with the control box of chamber 20C, which has a gas line connected with the control box of chamber 20D. The control box for chamber 20C either caps the T-connector or eliminates the T-connector so that the gas supply line to chamber 20D is simply connected to the output end of the control valve 265.

In this way, a single gas line connects the central controller 300 with four chambers 20A-D. Additionally, since the central controller 300 controls the control valves 265 for each chamber, the central controller can selectively control which chambers receive gas. For instance, if the operator only fills chambers 20A and 20B with animals, the operator may run a cycle without filling chamber 20C and 20D. To do so, during the set up for the cycle, the operator inputs data indicating that only chambers 20A and 20B contain animals. In response, the central controller 300 sends signals to the control valve 265 for chambers 20A and 20B to open the two control valves to allow the flow of gas to the chambers. At the same time, the central controller controls the control valve 265 for chamber 20C to keep the valve closed, which shuts off the supply of CO2 to both chamber 20C and 20D. Alternative connection can be provided for parallel connection of the chambers so that the flow of gas to each chamber is completely independent, if desired.

The control box 270 includes a plurality of indicator lights for providing feedback to the operator regarding the status of a particular chamber during a cycle. For instance, the control box may include a ready light 292 indicating that a chamber is ready to receive animals. For instance, the chamber is ready if a cycle is complete and the chamber has been evacuated. Similarly, the control box 270 may include an active light 290 indicating that the chamber is active so that the operator cannot or should not open the chamber. Further, the control box 270 may include a fault indicator 294 to indicate that there was an error or fault during processing that may require operator intervention. The indicator lights operate in response to signals received from the central controller 300.

A terminal block 276 provides a junction for electrical connection between the incoming data line and various components. For instance, A plurality of electrical connections are made between the input connector 285 and the terminal block to make connections for the incoming control signals from the central controller 300. Additionally, a plurality of electrical connection are made between the terminal block and elements such the control valve 265 and the indicator lights 290, 292, 294. Further still, a plurality of electrical connections are made between the terminal block and the output connector 287 to output signals to the control box of an adjacent chamber.

Exhaust

Figure 2:
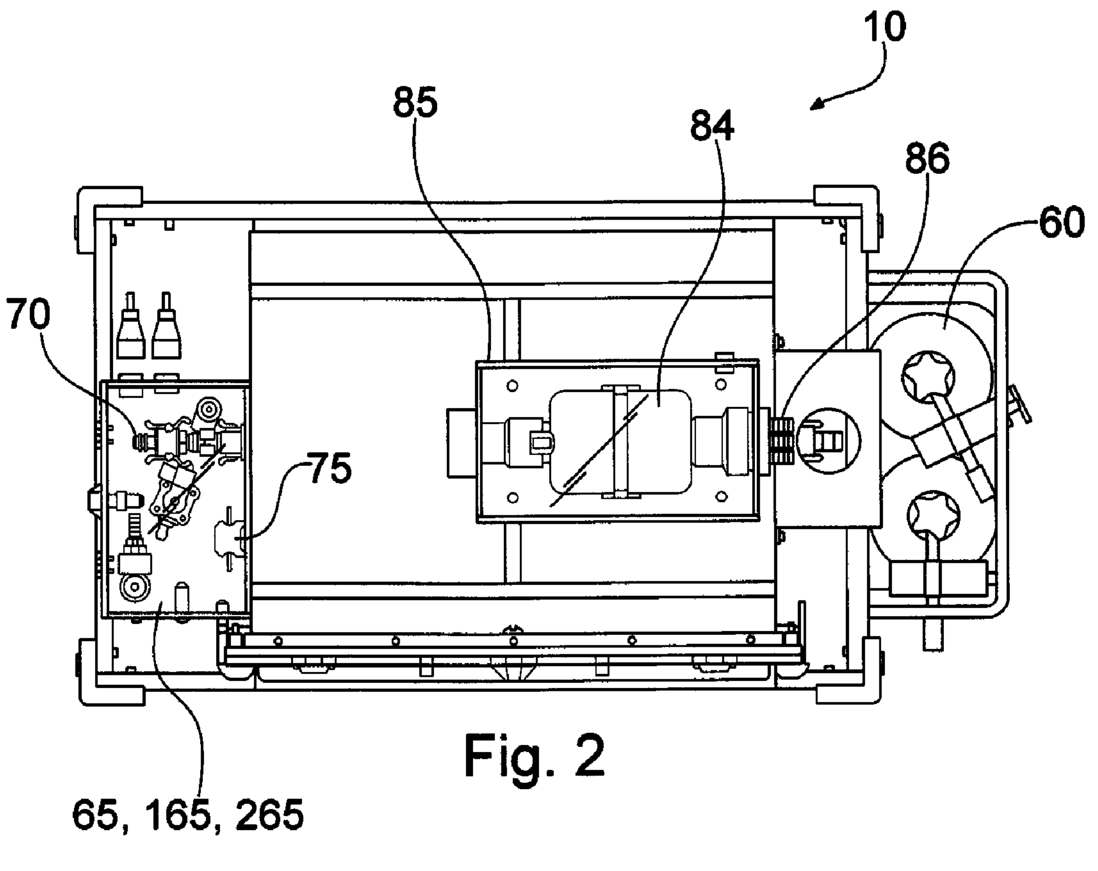
FIG. 2 is a top view of the system for euthanizing animals illustrated in FIG. 1.
Figure 3:
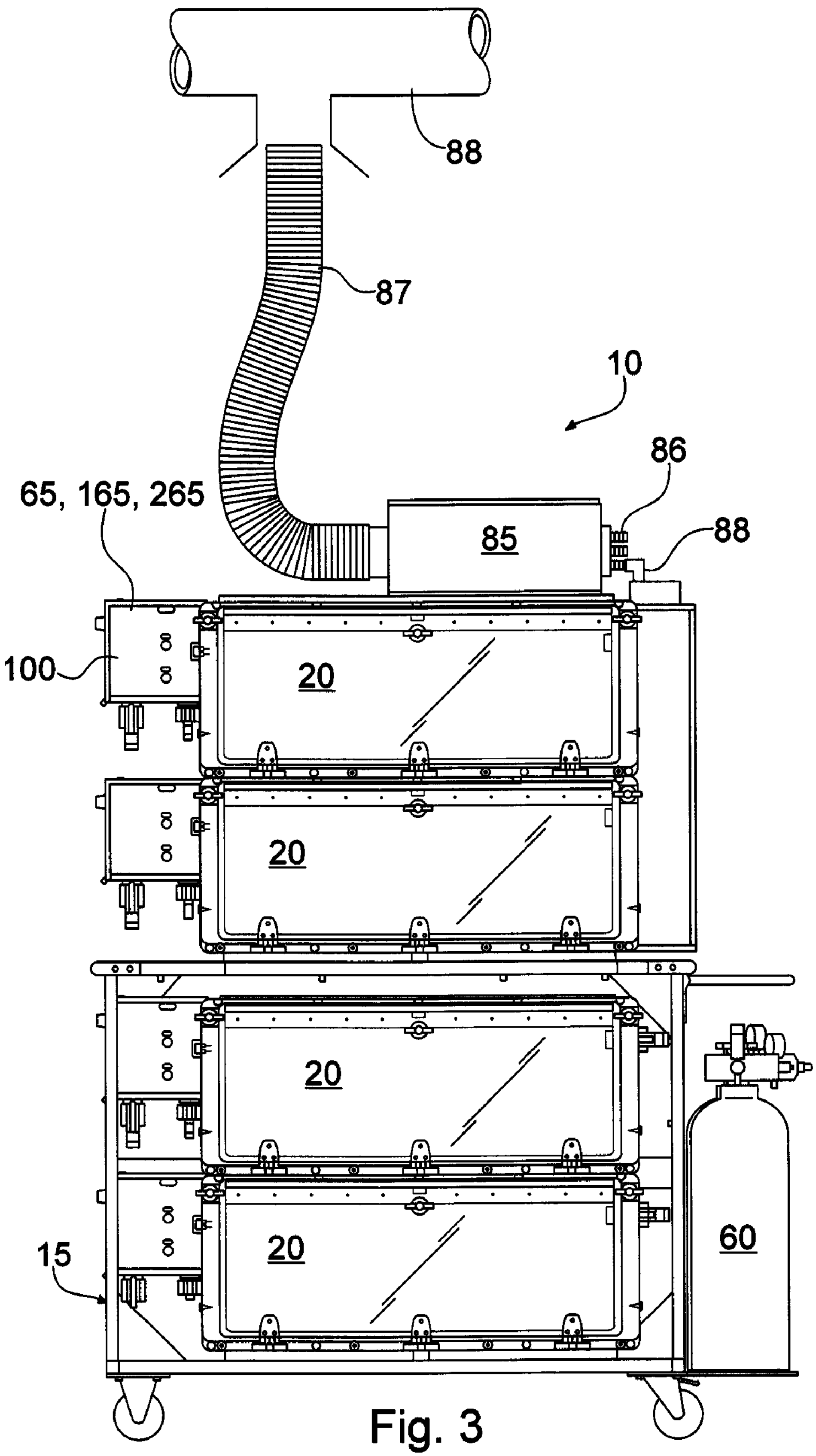
FIG. 3 is a front view of the system for euthanizing animals illustrated in FIG. 1, shown in connection with a secondary exhaust system.

As described above, the chamber includes an exhaust port 56 for connecting the chamber 20 with an exhaust line 80. The exhaust line 80 is a conduit for safely transporting the CO2 out of the chamber to limit operator exposure to the high levels of CO2 in the chamber. The exhaust line interconnects with an exhaust fan 84 that is in turn interconnected with a central exhaust line 87. The fan 84 is disposed within an enclosure mounted on top of the chamber. In an embodiment in which the system includes a plurality of chambers, a plurality of fans could be used for the various chambers, however, in the present instance, a single exhaust fan is used for all of the chambers and each chamber has a separate exhaust line that extends from the exhaust port 56 port of the chamber to the exhaust fan. As shown in FIGS. 1-2, the exhaust fan 84 includes a plurality of connectors 86 for connecting each of the exhaust lines with the fan.

The exhaust fan 84 is configured to provide suction to draw gas from the chamber(s). The fan 84 is interconnected with a central exhaust line so that the output from the fan discharges to the central exhaust line. In this way, the exhaust from each chamber is drawn through a separate exhaust line 80 and into the central exhaust line 87. In the present instance, the central exhaust line 87 is connected with a secondary exhaust 88. For instance, the secondary exhaust may be a central exhaust system located within a facility that provides a low level of suction to draw gases out of an area and to a central discharge. The exhaust line 87 may be connected with the secondary exhaust 88 so that the gas drawn from the chamber(s) is discharged to the secondary exhaust rather than the atmosphere around the system 10. In this way, the system safely disposes of the euthanizing gas without significant exposure to the operator.

Before the exhaust fan 84 starts, the supply line 62 is shut off so that the exhaust fan does not simply continue to draw CO2 out of the supply tank 60. However, by shutting off the supply line, the chamber is essentially sealed shut except for the exhaust port. In order to facilitate the gas being drawn out of the chamber, the refresh port is opened. The refresh port may be manually opened to allow the flow of ambient air into the chamber. However, in the present instance, the valve 75 controlling the flow through the refresh port 54 is a check valve that can be opened upon application of suction to overcome the bias of the check valve. Accordingly, the exhaust fan is configured so that the fan can provide sufficient suction to overcome the bias of the check valve to open the check valve. In this way, when the exhaust fan is turned on, the suction from the fan automatically opens the check valve in each chamber to open the chamber so that ambient air can be drawn into the chamber as the exhaust fan draws the gas out of the chamber.

Figure 7:
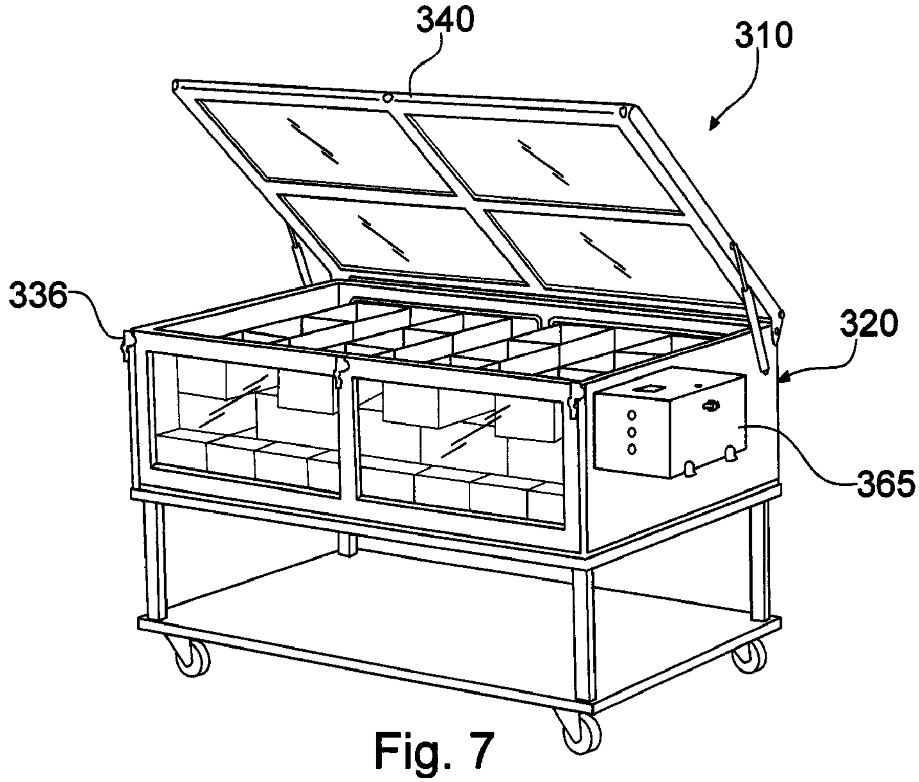
FIG. 7 is a perspective view of an alternate embodiment of a system for euthanizing animals.

Referring to FIG. 7, the system is illustrated in connection with a chamber having an alternative configuration. In FIG. 7, the system 310 includes a top-load chamber 320. The chamber 320 is significantly larger than the chamber 20 illustrated in FIGS. 1-6. Specifically, the alternate chamber 320 is configured to accommodate up to 51 mouse cages.

The top-load chamber 320 is substantially enclosed on five sides, having a generally open top side. A door 340 is pivotally connected to the rear side adjacent the top of the chamber, so that the door 340 can pivot downwardly against the top edge of the chamber. A seal is disposed around the periphery of the top of the chamber, and the door engages the seal to form a fluid-tight seal with the door is closed against the top of the chamber. The system 310 also includes a gas control assembly 365 for manually or automatically controlling the flow of gas to the chamber similar to the gas control assemblies discussed above in connection with the previous embodiment 10. Additionally, as with the previous embodiment, the alternative embodiment includes a valve for controlling the flow of ambient air into the chamber. The valve is closed during the introduction of gas into the chamber and during any dwell period. However, the valve is opened to allow the chamber to be exhausted as in the previous embodiment. Although a variety of valves can be used to control the low of ambient air into the chamber, a check valve is used similar to the check valve 75 in the embodiment described above. Further, the alternate system includes an exhaust fan that is substantially similar to the fan 84 described above, and the system includes an exhaust line that interconnects the exhaust fan with the secondary exhaust system as described previously in the earlier embodiment. Additionally, the system 310 includes an exhaust line that forms a fluid-tight connection with the chamber. The chamber exhaust line may be connected with the chamber similar to the exhaust line 80 described above. Although the exhaust line may be connected similar to the previous exhaust line, in exhaust line in the alternative chamber may be substantially larger than the exhaust line in the first embodiment. For instance, the exhaust line in the first embodiment is approximately 1" in diameter, whereas the exhaust line in the alternative embodiment may be at least 3" in diameter.

In addition to the configurations described above, an alternate configuration if illustrated in FIG. 12. In this alternate configuration, a second column 370 of chambers is interconnected with the first column 360 of chambers. For instance, as discussed above, a first column 360 of chambers 20A-D may be interconnected with the gas supply and the exhaust system. The first column 360 may be interconnected with a second column 370 of four chamber, so that each chamber in the first column is interconnected with a second chamber in the second column.

Specifically, the second column 370 of chambers may include four chambers 20 E-H. A gas supply connection line 340 connects the gas supply line of chamber 20A with chamber 20E. The gas supply connection line 340 is a direct connection to chamber 20E, so that as long as gas flows to chamber 20A, gas also flows to chamber 20E. Similarly, a gas supply connection line connects chamber 20B with chamber 20F; a gas supply connection line connects chamber 20C with chamber 20G; and a gas supply connection line connects chamber 20D with chamber 20H. In this way, the flow of gas to each of the chambers in the second column 370 is controlled by the flow of gas to the respective connected chamber in the first column 360.

In addition to gas supply lines connecting the chambers in the two columns, a plurality of exhaust connection lines 350 connect the chambers in the first and second columns. Specifically, an exhaust connection line 350 connects chamber 20A with chamber 20D. Similarly, separate exhaust connection lines connect the pairs of chambers parallel to the gas supply lines discussed above. The exhaust fan 84 is connected with each of the chambers in the second column 370. Therefore, all of the chambers are exhausted through the chambers in the second column. Specifically, when the exhaust fan is actuated, each of the four separate exhaust lines between the exhaust fan and each chamber 20E-H draws gas from chambers 20E-H. As the exhaust fan draws the gas from the chambers in the second column 370, gas is pulled from chambers 20A-20D through the exhaust connection lines 350.

Operation of System

Configured as described above, the system facilitates safe and humane anesthetization and euthanization of a wide range of animals. The system can be configured as either a manual or automatic control system, depending on the user's need.

Manual Operation

In one configuration, the system incorporates manual control of the gas supply, which may be $CO_2$. In a manual system, the flow of gas is controlled manually, such as by opening the regulator on the tank, or by operating some other manual control valve. To commence a procedure, the operator simply opens the gas controller which allows gas to flow into the chamber 20. If the system includes several chambers and the procedure is to be performed on each chamber, then the gas controller for each chamber is opened so that the $CO_2$ flows into each chamber. In the present embodiment, the chamber includes a manifold or rail, so that the gas flows through a plurality of ports along the top of the chamber. In this way, the $CO_2$ is substantially evenly distributed throughout each chamber.

While the $CO_2$ flows into the chamber, gas within the chamber bleeds out through the exhaust line 80. The gas continues to bleed through the exhaust port to prevent the buildup of gas pressure within the chamber 20. The bleed off gas flows through the exhaust line 80 and is pulled up into the secondary exhaust 88 by the suction provided by the secondary exhaust.

After the operator has allowed a sufficient amount of gas to flow into the chamber or chambers, the operator may manipulate the gas controller 65 to close the supply of $CO_2$ to the chamber(s). For instance, the operator may cease the flow of $CO_2$ after the level of $CO_2$ reaches 800-900,000 parts per million. After ceasing the supply of carbon dioxide, the operator may wait a period of time to allow the gas to fully anesthetize/euthanize the animals. During this time, the chamber(s) remain substantially sealed to retain a high concentration of $CO_2$ within the chamber.

The period of time that the chambers remain sealed after the supply of CO2 is discontinued is referred to as the dwell period. The dwell period may vary depending upon the type of animals in the chamber, the age of the animals, the size of the animals, and other factors. Generally, it is desirable for the dwell period for the chamber to last for at least as long as the length of time that CO2 was being introduced into the chamber. Further, the dwell period in present instance lasts at least 2-3 times as long as the length of time that CO2 was introduced into the chamber. For instance, by way of example, the CO2 may be introduced into the chamber for approximately 3-5 minutes, and the dwell time may last approximately 15 minutes or longer.

By allowing for an extended dwell period, the operator can be assured that the animals are exposed to a high concentration of gas for an extended period of time. This is particularly desirable for euthanization procedures. One concern with euthanization procedures using CO2 is that the animal may be anesthetized but not euthanized. To ensure that the animals are euthanized, the standard protocol for most organizations is to perform a secondary euthanization procedure to ensure that the animal is humanely euthanized. However, such secondary procedures require substantial manual intervention by the operator, and can be quite time-consuming. By providing the dwell period, the operator can be certain that the animals are completely euthanized, thereby eliminating the need for a secondary euthanization procedure.

After the dwell period, the operator unseals the chamber to exhaust the carbon dioxide from the chamber. If the system is configured without exhaust, the operator may simply open the door 40 to allow the CO2 to discharge out of the chamber, through the front opening. Although such a configuration may be employed, it is desirable to utilize an exhaust system that captures the euthanization gas. Accordingly, as discussed above, even for a manual control system, preferably, the system includes an exhaust system that draws the CO2 out of the chamber and discharges the CO2 in a remote location. Specifically, the system includes an exhaust fan that draws the CO2 out of the chamber and toward a secondary exhaust 88.

Automated Control—Fixed Flow

In an automated fixed flow mode, the system provides a fixed flow of CO2 to the chamber for a predetermined period of time. Specifically, the system includes a gas controller that incorporates an electronic control system having a timer. When the operator presses the start button, the gas controller 65 automatically controls a solenoid to open the valve to allow CO2 to flow from the supply line 62 to the chamber 20 through the supply port. As the CO2 enters the chamber, gas from the chamber bleeds out through the exhaust line 80 to prevent the build-up of excess pressure in the chamber. After a predetermined time, the gas controller automatically controls the solenoid to close the valve to discontinue the flow of CO2 into the chamber. At this point, the controller may activate the exhaust fan to exhaust the gas from the chamber. However, preferably the controller delays activation of the exhaust fan to provide a dwell period as discussed above. The dwell period may vary, however, in the present instance, the dwell period in a predefined parameter that is not varied by the operator. After the dwell period, the controller commences the exhaust fan to exhaust the CO2. Specifically, the gas controller and the exhaust fan are in electrical communication so that the gas controller can control operation of the exhaust fan. When the exhaust fan is started, the fan provides suction which builds sufficient suction within the chamber to pull open the check valve 75 to open the chamber to a flow of ambient air from outside the chamber. The ambient air flows into the chamber through the valve as the exhaust fan draws the CO2 out of the chamber. After a predefined period of time, the gas controller turns off the exhaust fan. After the fan turns off, the check valve 75 automatically closes again, thereby sealing the refresh port 54.

In this way, it can be seen that the system provides a readily operable system that can safely and humanely euthanize animals, even when operated by individuals with limited training. Additionally, in order to ease the operation, preferably the system includes a simple start button, so that all the user needs to do to commence a procedure is press the start button. A lock may be provided so that the system cannot be operated without a key, thereby preventing unauthorized individuals from operating the system. Alternatively, the system may include a lock that prevent changes from being made to the system, such as the length of the gas introduction period, the flow rate during gas introduction, the length of the dwell period and the length that the exhaust fan is run. Each of these variables may be changed, however, the system may include a lock that prevents unauthorized individuals from making such changes. Instead, individuals without a key can only start or stop the system.

As discussed above, the gas controller controls the flow of CO2 into the chamber for a predefined period of time. However, the flow of gas may be discontinued in response to the door being opened. Specifically, the sensor may provide an override that automatically shuts off the supply of CO2 in the event that the door sensor indicates that the door is open.

Automated Control—Variable Flow

In addition to the automated control fixed flow option, the system may be configured to allow the flow of CO2 to be varied, in addition to being automatically stopped and started. In such a configuration, the system controls the flow of gas according to a variable flow program. The program is determined in response to input regarding the particular features of a procedure.

For example, the system may include a user interface that allows the operator to adjust various job parameters, such as the type of animal(s) in the procedure, the age of the animal(s) and the number of animal(s) in the procedure. Based on the input from the operator, the system calculates the appropriate flow characteristics for the procedure. For instance, in order to mitigate discomfort to the animals, the flow rate of CO2 may be controlled to start at a slow rate. The central processor provides signals to the mass flow controller indicative of the low flow rate for the beginning stages of a procedure, which may be the anesthetization stage.

After the anesthetization stage, the flow rate of CO2 may be increased to more rapidly reach an concentration that will euthanize the animals. Finally, depending on the parameters for the particular procedure, the dwell period may vary. Accordingly, the central processor controls the mass flow controller to shut off the flow of CO2 during the dwell time. At the same time, the central processor does not send a signal to the exhaust fan to commence the exhaust. Instead, the exhaust fan remains off during the dwell period. At the end of the dwell period, the central processor automatically starts the exhaust fan to exhaust the CO2 from the chamber(s). After a predefined time, the central processor shuts off the exhaust fan. In the present instance, the design parameters for the control of the fan under both fixed flow and variable flow are calculated to run the fan for a period of time to reduce the CO2 levels in the chamber to approximately 3,000 parts per million.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

The invention claimed is:

1. A laboratory system for euthanizing animals with a sedative gas, comprising:

a chamber having a gas supply port for supplying sedative gas to the chamber, an exhaust port for discharging the sedative gas from the chamber and an ambient air port for introducing ambient air into the chamber;

an exhaust element operable to provide suction to draw sedative gas out of the chamber through the exhaust port;

a valve controlling flow of air through the ambient air port, wherein the valve is biased toward a closed position;

wherein upon activation of the exhaust fan suction from the exhaust fan overcomes the bias of the valve, displacing the valve into the open position.

2. A laboratory system according to claim 1, wherein said chamber has upper and lower walls, and front, back and side walls providing an enclosure with a width, depth and height for receiving the animals, said enclosure having a hollow gas-distribution rail with gas-ejection openings for distributing the gas across substantially the full width and length of said lower wall.

3. A laboratory system according to claim 2, wherein said sedative gas has a density greater than air, said rail being positioned adjacent said upper wall, and said gas ejection openings are directed toward the full width and length of the lower wall.

4. A laboratory system according to claim 2, including a first control for controlling the flow of said sedative gas into said distribution rail, a second control for said exhaust element, and delay element to defer activation of said exhaust element for a selected time period after interruption of the flow of sedative gas into said enclosure.

5. A laboratory system according to claim 4, wherein said first and second controls are programmable controls which may be preset to operate for selected timed intervals.

6. A laboratory system according to claim 5, including a keyed lock for said programmable controls to prevent unauthorized personnel from altering the selected timed intervals, and a security key for disabling the lock to allow the selected time interval to be modified.

7. A laboratory system according to claim 4, wherein said delay element is programmable to establish said selected time period, and including a keyed lock for said programmable delay means and a security key for opening said lock to prevent unauthorized personnel from altering the selected time period.

8. A laboratory system according to claim 4 in which said first and second controls and said delay element are programmable, said system including a central controller to set the programming of said programmable controls and delay element, and a recorder to create a record of the settings, the time of the settings and the operator responsible for the settings.

9. A laboratory system according to claim 1 for use in a work room having human occupants and a supply of sedative gas connected to said gas supply port, said chamber having an access door which may be opened to enable loading and unloading of animals into and from said chamber, said door having a latch to maintain the door closed to isolate the chamber from the atmosphere of the work room , and a sensor having connections to said sedative gas supply, wherein, when the latch is operated to open the door the sensor provides a signal to a controller to discontinue said supply of sedative gas to said gas supply port.

10. The laboratory system of claim 1 wherein upon deactivation of the exhaust element the valve returns to the closed position.

11. A chamber for euthanizing laboratory animals, comprising:

a generally enclosed container for receiving a live animal, wherein the container has an opening and a width;

a door closing the opening;

a supply port in the container for connecting the container with a supply of euthanizing gas;

a manifold extending along the width of the container for distributing the gas within the container.

12. The chamber of claim 11 wherein the manifold comprises a plurality of ports spaced apart along the width of the container to provide a plurality of inlet ports into the container.

13. The chamber of claim 11 wherein the manifold is in fluid communication with the supply port for receiving the euthanizing gas from the supply of euthanizing gas.

14. A laboratory system for euthanizing animals with a sedative gas, comprising:

a gas supply port for supplying sedative gas to a chamber, an exhaust port for discharging the sedative gas from the chamber and an ambient air port for introducing ambient air into the chamber;

an exhaust element operable to draw sedative gas out of the chamber through the exhaust port;

a valve controlling flow of air through the ambient air port, wherein the valve is biased toward a closed position;

wherein in response to activation of the exhaust fan the valve opens to permit the flow of ambient air into the chamber through the valve.

15. The laboratory system of claim 14 wherein in response to deactivation of the exhaust fan the valve returns to the closed position.

16. The laboratory system of claim 14 comprising a controller operable to control the flow of sedative gas into the chamber and to control operation of the exhaust element.

17. The laboratory system of claim 16 wherein the controller controls the flow of sedative gas and the operation of the exhaust element in response to a pre-determined program.

18. The laboratory system of claim 17 wherein the predetermined program comprises a time period for controlling the flow of sedative gas so that sedative gas flows into the chamber and a time period for engaging and disengaging the exhaust element.

19. The laboratory system of claim 16 for use in a work room having human occupants and a supply of sedative gas connected to the gas supply port, wherein the system comprises the chamber and the chamber comprises:

an access door which may be opened to enable loading and unloading of animals into and from the chamber, wherein the door has a latch to maintain the door closed to isolate the chamber from the atmosphere of the work room, and a sensor operable connected with the sedative gas supply, wherein when the latch is operated to open the door the sensor provides a signal to the controller to discontinue the supply of sedative gas to the gas supply port.

20. The laboratory system of claim 14 wherein the valve is operable to automatically open in response to a pre-determined level of suction from the exhaust element.

21. The laboratory system of claim 20 wherein the valve is operable to automatically close in response to a reduction of suction from the exhaust element below a closing level.

* * * * *